United States Patent
Hasbe et al.

(10) Patent No.: US 10,681,129 B1
(45) Date of Patent: Jun. 9, 2020

(54) SYSTEMS AND METHODS FOR RECOVERING DATA

(71) Applicant: Veritas Technologies LLC, Mountain View, CA (US)

(72) Inventors: Sunil Hasbe, Shirur Anantpal (IN); Subash Rajaa, Pune (IN); Hrudil Gorantla, Guntur (IN); Rushikesh Patil, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 252 days.

(21) Appl. No.: 15/702,694

(22) Filed: Sep. 12, 2017

(51) Int. Cl.
*H04L 29/08* (2006.01)
*G06F 9/48* (2006.01)

(52) U.S. Cl.
CPC ........ *H04L 67/1095* (2013.01); *G06F 9/4843* (2013.01); *H04L 67/1097* (2013.01)

(58) Field of Classification Search
CPC .................. G06F 11/1464; H04L 67/1097
See application file for complete search history.

(56) References Cited

U.S. PATENT DOCUMENTS

| 9,563,517 B1* | 2/2017 | Natanzon ............ G06F 11/1464 |
| 2015/0227602 A1* | 8/2015 | Ramu ...................... G06F 16/27 |
| | | 707/634 |
| 2015/0281322 A1* | 10/2015 | Dingwell .............. H04L 67/025 |
| | | 705/26.82 |
| 2017/0129371 A1* | 5/2017 | Knox ....................... B60N 2/39 |
| 2017/0262204 A1* | 9/2017 | Dornemann ........ G06F 9/45558 |

* cited by examiner

*Primary Examiner* — Philip J Chea
*Assistant Examiner* — Mohammed Ahmed
(74) *Attorney, Agent, or Firm* — FisherBroyles, LLP (57) ABSTRACT

The disclosed computer-implemented method for recovering data may include (i) accumulating a list of changed blocks that have changed in a replicated source volume over a continuous-data-protection window of time, (ii) receiving a request to recover data in a replication target volume of the replicated source volume, (iii) converting the changed blocks to a changed-block volume that is paired with the replication target volume, (iv) launching a virtual machine from the replication target volume and the paired changed-block volume, (v) determining that an intercepted read request is directed to a changed block stored within the changed-block volume, and (vi) redirecting the intercepted read request from the replication target volume to the changed-block volume to fulfill the intercepted read request. Various other methods, systems, and computer-readable media are also disclosed.

20 Claims, 5 Drawing Sheets

SYSTEMS AND METHODS FOR RECOVERING DATA

BACKGROUND

Cloud storage services can recover data for customers using volume snapshots. Nevertheless, recovering data from any point in time has high storage costs. For example, recovering the data from any point in time may depend upon the snapshots that are provided by cloud storage services. In one specific example, a replication solution may generate an update set of changed blocks over a period of time. The replication solution then may transmit the update set to an application host, which transmits the update set to a premise gateway, which in turn transmits the update set to a cloud gateway.

In this example, a continuous data protection solution is dependent upon the snapshots that are provided by the cloud storage service. Moreover, the continuous data protection solution may compromise the RECOVERY TIME OBJECTIVE or "RTO" (i.e., in the case of object storage). Specifically, performing restoration from a snapshot may increase the RTO because the volume conversion may also take significant time. Additionally, the snapshot solution is high cost and results in a low level of granularity (e.g., one snapshot per day). In view of the above, traditional systems and methods for recovering data (e.g., according to continuous data protection) may fail to be optimized along one or more dimensions, as discussed further below. The instant disclosure, therefore, identifies and addresses a need for improved systems and methods for recovering data.

SUMMARY

As will be described in greater detail below, the instant disclosure describes various example systems and methods for recovering data. In one example, a computer-implemented method for recovering data may include (i) accumulating a list of changed blocks that have changed in a replicated source volume over a continuous-data-protection window of time, (ii) receiving a request to recover data in a replication target volume of the replicated source volume, (iii) converting the changed blocks to a changed-block volume that is paired with the replication target volume, (iv) launching a virtual machine from the replication target volume and the paired changed-block volume, (v) determining that an intercepted read request is directed to a changed block stored within the changed-block volume, and (vi) redirecting the intercepted read request from the replication target volume to the changed-block volume to fulfill the intercepted read request.

In some examples, redirecting the intercepted read request from the replication target volume to the changed-block volume is performed by a kernel-level module. In one embodiment, the kernel-level module is configured to intercept each read request at the virtual machine that issues over a period of time. In one embodiment, the method further includes generating metadata for the changed-block volume that specifies details about the changed blocks. Moreover, in this example, the kernel-level module performs redirecting the intercepted read request from the replication target volume to the changed-block volume at least in part by referencing the generated metadata for the changed-block volume.

In one embodiment, the kernel-level module performs redirecting the intercepted read request inside of the virtual machine without accessing a hypervisor that executes the virtual machine. In further embodiments, the replication target volume is stored in a third-party cloud storage service and the kernel-level module is cloud storage service agnostic.

In some examples, the computer-implemented method may further include synchronizing the replication target volume with the changed-block volume such that the replication target volume accurately reflects the changed blocks. In some examples, synchronizing the replication target volume with the changed-block volume is performed upon expiration of the continuous-data-protection window of time.

In some examples, the computer-implemented method may further include receiving user input that specifies a length of the continuous-data-protection window of time. In some examples, receiving the request to recover data in the replication target volume of the replicated source volume may include receiving a request to recover the replicated source volume to a specified point of time within the continuous-data-protection window of time.

In one embodiment, a system for implementing the above-described method may include (i) an accumulation module, stored in memory, that accumulates a list of changed blocks that have changed in a replicated source volume over a continuous-data-protection window of time, (ii) a reception module, stored in memory, that receives a request to recover data in a replication target volume of the replicated source volume, (iii) a conversion module, stored in memory, that converts the changed blocks to a changed-block volume that is paired with the replication target volume, (iv) a launching module, stored in memory, that launches a virtual machine from the replication target volume and the paired changed-block volume, (v) a determination module, stored in memory, that determines that an intercepted read request is directed to a changed block stored within the changed-block volume, (vi) a redirection module, stored in memory, that redirects the intercepted read request from the replication target volume to the changed-block volume to fulfill the intercepted read request, and (vii) at least one physical processor configured to execute the accumulation module, the reception module, the conversion module, the launching module, the determination module, and the redirection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) accumulate a list of changed blocks that have changed in a replicated source volume over a continuous-data-protection window of time, (ii) receive a request to recover data in a replication target volume of the replicated source volume, (iii) convert the changed blocks to a changed-block volume that is paired with the replication target volume, (iv) launch a virtual machine from the replication target volume and the paired changed-block volume, (v) determine that an intercepted read request is directed to a changed block stored within the changed-block volume, and (vi) redirect the intercepted read request from the replication target volume to the changed-block volume to fulfill the intercepted read request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for recovering data. As described further below, the disclosed systems and methods may generally reduce the cost and storage size for performing continuous data protection on a protected storage volume. The disclosed systems and methods may also achieve these benefits in a manner that is cloud storage service agnostic. Furthermore, the disclosed systems and methods may also achieve these benefits without accessing a hypervisor of a virtual machine.

Figure 1:
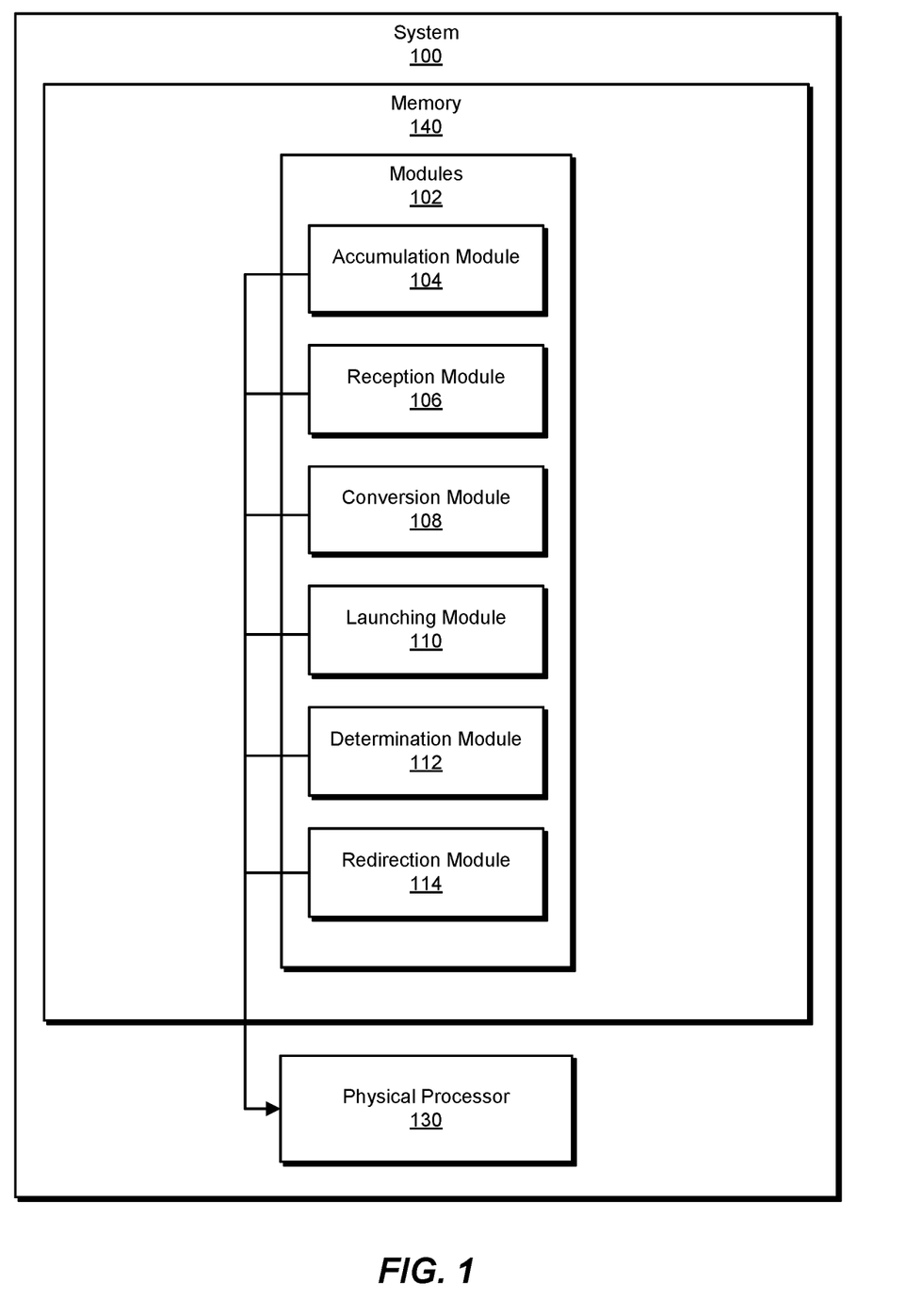
FIG. 1 is a block diagram of an example system for recovering data.
Figure 2:
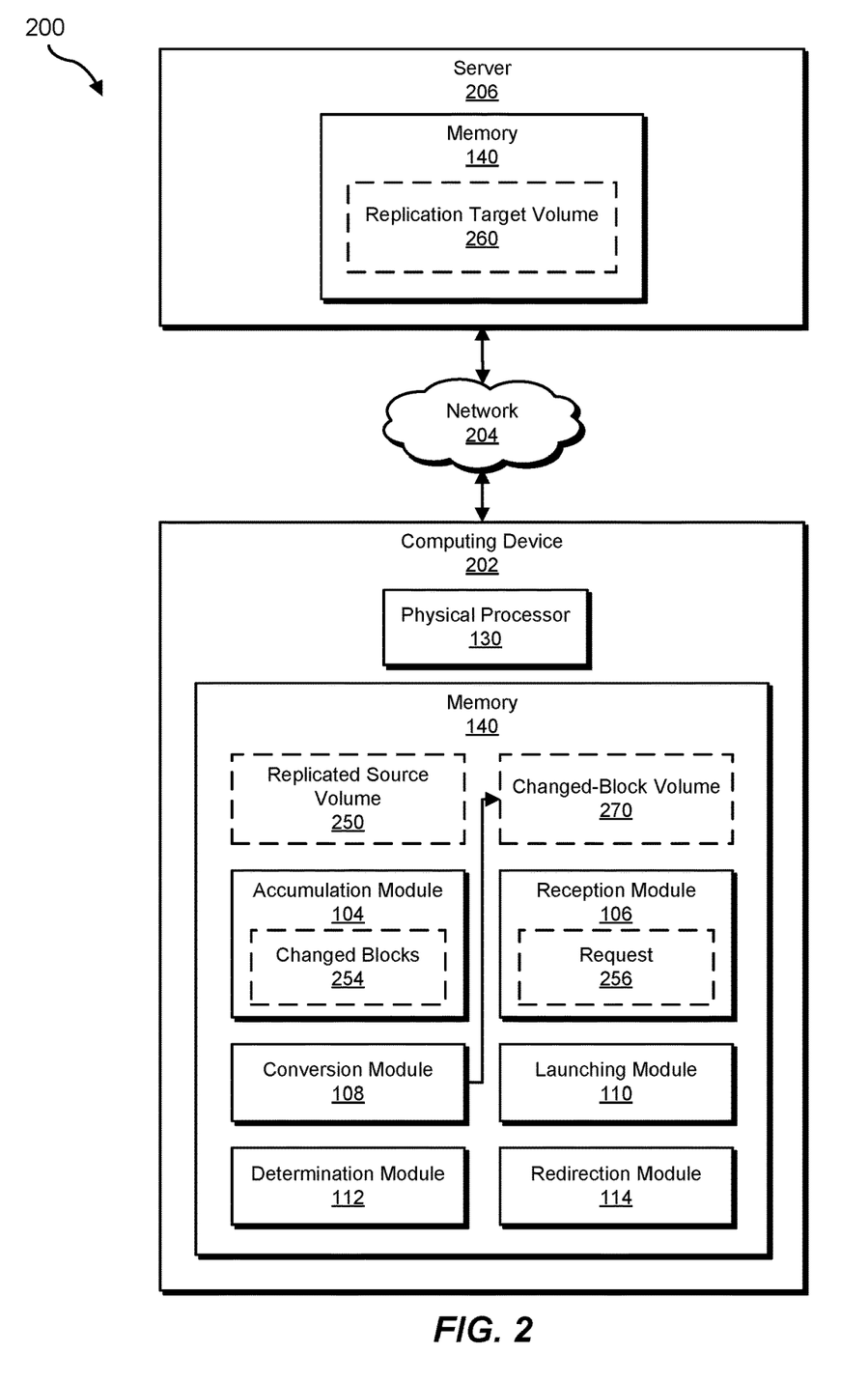
FIG. 2 is a block diagram of an additional example system for recovering data.

The following will provide, with reference to FIGS. 1-2, detailed descriptions of example systems for recovering data. Detailed descriptions of corresponding computer-implemented methods will also be provided in connection with FIG. 3-5.

FIG. 1 is a block diagram of example system 100 for recovering data. As illustrated in this figure, example system 100 may include one or more modules 102 for performing one or more tasks. For example, and as will be explained in greater detail below, example system 100 may include an accumulation module 104 that accumulates a list of changed blocks that have changed in a replicated source volume over a continuous-data-protection window of time. Example system 100 may additionally include a reception module 106 that receives a request to recover data in a replication target volume of the replicated source volume. Example system 100 may also include a conversion module 108 that converts the changed blocks to a changed-block volume that is paired with the replication target volume.

Example system 100 may additionally include a launching module 110 that launches a virtual machine from the replication target volume and the paired changed-block volume. Example system 100 may also include a determination module 112 that determines that an intercepted read request is directed to a changed block stored within the changed-block volume. Furthermore, example system 100 may include a redirection module 114 that redirects the intercepted read request from the replication target volume to the changed-block volume to fulfill the intercepted read request. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate recovering data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to recover data (e.g., recover data according to continuous data protection).

In the example of FIG. 2, accumulation module 104 may accumulate a list of changed blocks, such as changed blocks 254, that have changed in a replicated source volume 250 over a continuous-data-protection window of time. Reception module 106 may receive a request, such as a request 256, to recover data in a replication target volume 260 of the replicated source volume 250. Replication target volume 260 may be stored within server 206, and replicated source volume 250 may be stored within computing device 202.

Figure 5:
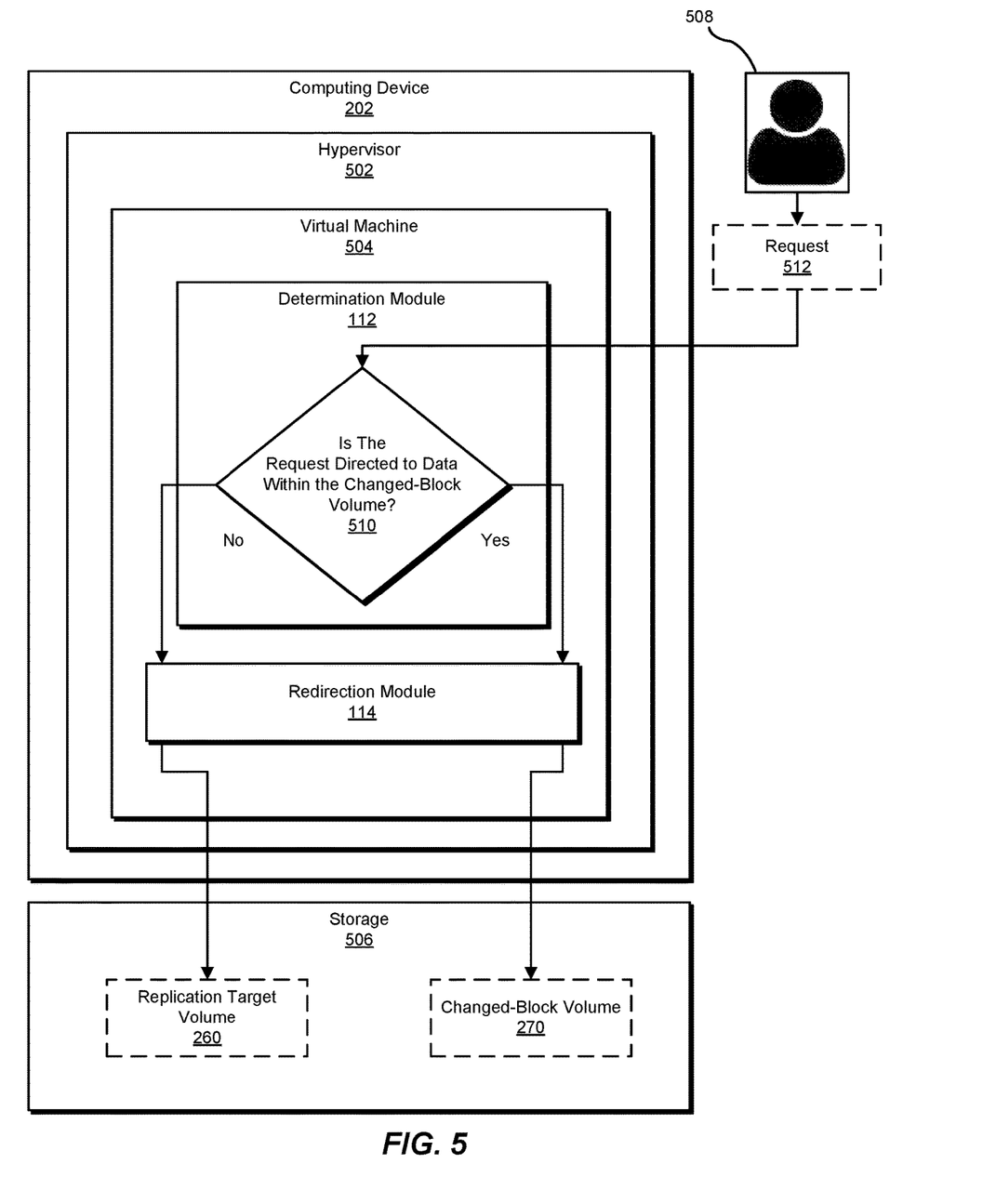
FIG. 5 is a workflow diagram of an example workflow corresponding to the performance of an example method for recovering data.

Conversion module 108 may convert changed blocks 254 into a changed-block volume 270 that is paired with replication target volume 260. Moreover, launching module 110 may launch a virtual machine from replication target volume 260 and changed-block volume 270. Subsequently, determination module 112 may determine that an intercepted read request is directed to a changed block stored within changed-block volume 270 (the intercepted read request is illustrated in the example of FIG. 5, which is discussed further below). Consequently, redirection module 114 may redirect the intercepted read request from replication target volume 260 to changed-block volume 270 to fulfill the intercepted read request.

Computing device 202 generally represents any type or form of computing device capable of reading computer-executable instructions. In one example embodiment, computing device 202 may correspond to a client or customer computing device that executes a virtual machine and that also replicates a volume for the virtual machine to a cloud storage server, such as server 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of performing, or facilitating the performance of, method 300. In one example, server 206 may correspond to a cloud storage server that stores a replication target volume, as discussed further below. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
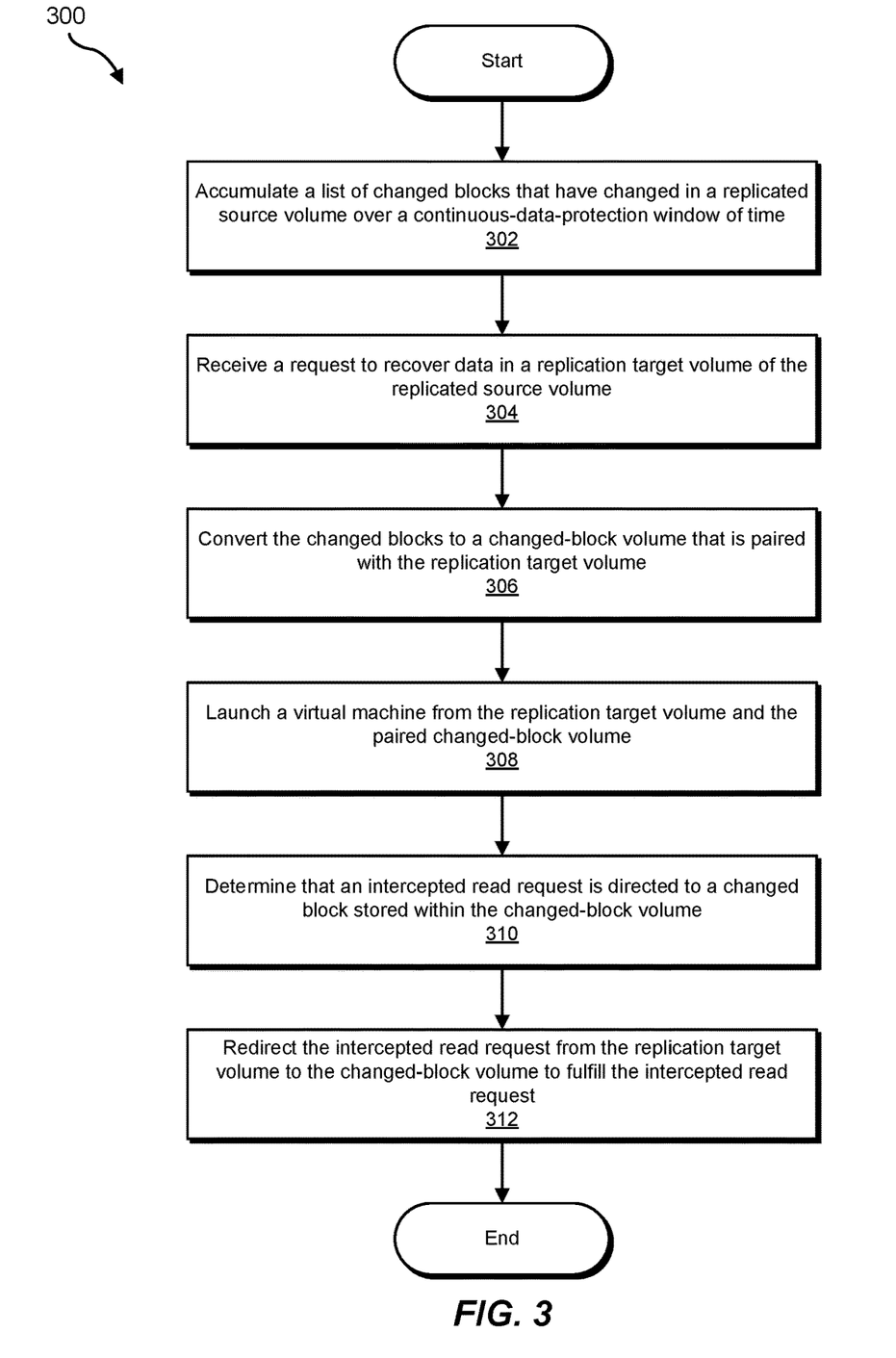
FIG. 3 is a flow diagram of an example method for recovering data.

FIG. 3 is a flow diagram of an example computer-implemented method 300 for recovering data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may accumulate a list of changed blocks that have changed in a replicated source volume over a continuous-data-protection window of time. For example, accumulation module 104 may, as part of computing device 202 in FIG. 2, accumulate a list of changed blocks 254 that have changed in replicated source volume 250 over a continuous-data-protection window of time.

As used herein, the term "changed blocks" generally refers to blocks of data, within a replication storage system such as system 100 or system 200, that have changed since the previous backup or replication of the blocks of data. Additionally, as used herein, the term "continuous-data-protection window of time" generally refers to a window of time in which changed blocks are accumulated, in accordance with step 302, such that method 300 may recover data, according to continuous data protection, to any specific point of time within that window of time. In other words, "continuous data protection" generally refers to protecting, and storing, all changes that are made to data over a period of time such that the data can later be recovered to any specific point of time. The protection of the data is thereby "continuous." Furthermore, as used herein, the term "replicated source volume" generally refers to a volume of data that is replicated to another volume or destination, such as replication target volume 260 on server 206, thereby serving as a "source" for the replication.

Accumulation module 104 may accumulate the changed blocks in a variety of ways. In general, accumulation module 104 may monitor for changes to blocks of data within the protected volume, such as replicated source volume 250. As part of monitoring for changes to blocks of data within the protected volume, accumulation module 104 may detect at least one change to the blocks of data. In response, accumulation module 104 may record the one or more blocks of data that changed. In some examples, accumulation module 104 may execute as part of a kernel level, operating system level, low level, and/or driver level module that monitors, detects, intercepts, and/or records changes to blocks of data, as described further above.

Figure 4:
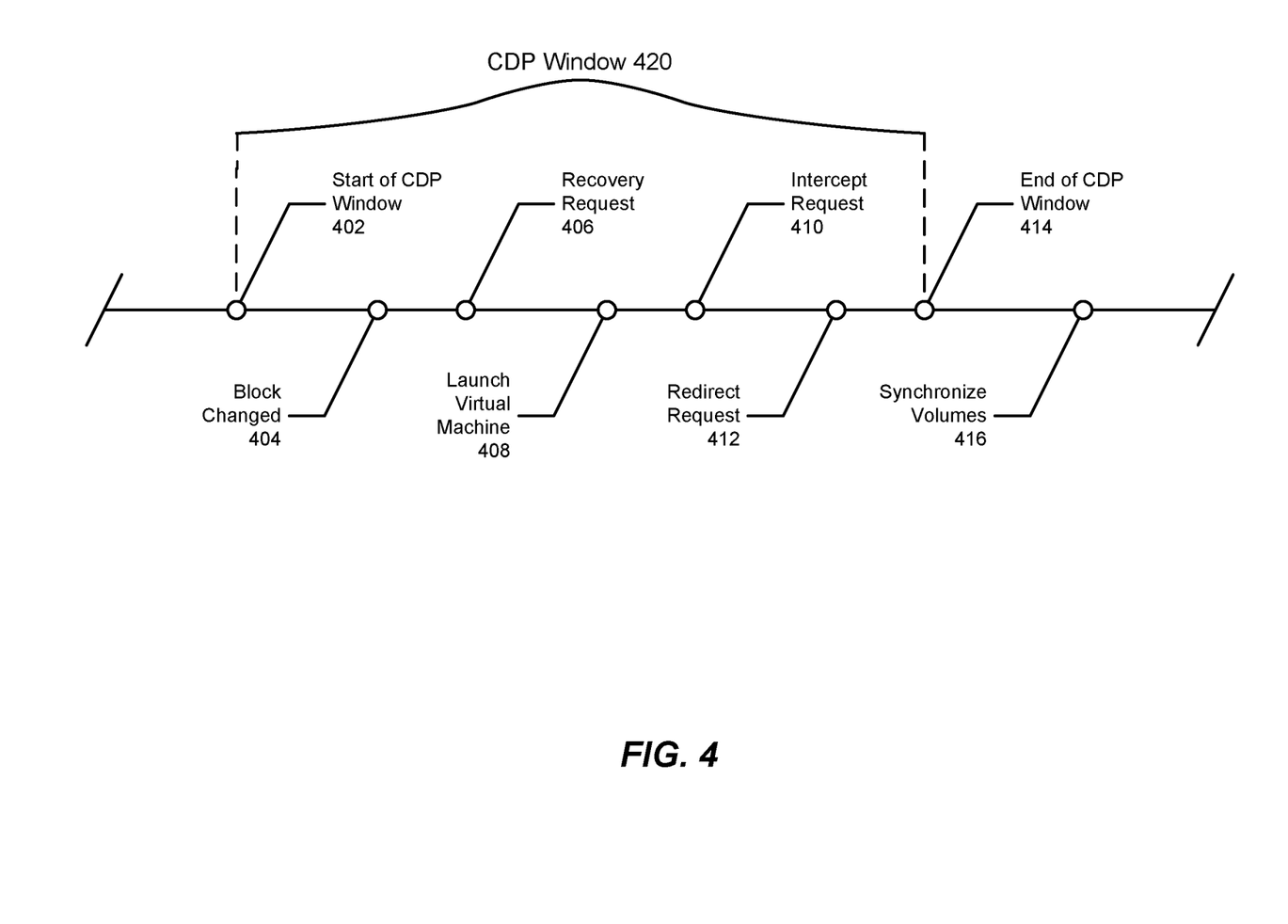
FIG. 4 is a timing diagram that illustrates a timing of an example method for recovering data.

As further discussed above, accumulation module 104 may accumulate the changed blocks over all or part of the continuous-data-protection window of time. FIG. 4 shows an example timing diagram that illustrates the timing of the performance of method 300, according to one embodiment. As further shown in this figure, the timing diagram may specify a continuous-data-protection window, or CDP window 420. CDP window 420 may begin at step 402 and conclude at step 414. The remaining steps of the timing diagram shown in FIG. 4 will be discussed further below in connection with steps 304-312 of method 300 and FIG. 3.

At step 304, one or more of the systems described herein may receive a request to recover data in a replication target volume of the replicated source volume. For example, reception module 106 may, as part of computing device 202 in FIG. 2, receive request 256 to recover data in replication target volume 260 of replicated source volume 250.

Reception module 106 may receive the request to recover data in the replication target volume in a variety of ways. In some examples, reception module 106 may receive the request from a user or user account. In additional, or alternative, examples, reception module 106 may receive the request from an external program or process. In the example of FIG. 4, reception module 106 may receive the request to recover data in the replication target volume at step 406.

In further examples, the request to recover data in the replication target volume may specify a point in time to which to recover the data. In other words, system 100 or system 200 may provide continuous data protection for data in the protected volume as the data changes across CDP window 420. Accordingly, at step 304, reception module 106 may receive a request to recover data in the replication target volume and the request may specify a point in time to which to recover the data. In some examples, the specified point in time may fall within CDP window 420. As one illustrative example, the request may specify a point in time just prior to, or just after, a block change at step 404 of the timing diagram of FIG. 4.

Furthermore, in some examples, reception module 106 may further receive user input that specifies a length of the continuous-data-protection window of time. Reception module 106 may receive this input from a user, a user account, and/or a separate process or program. Moreover, reception module 106 may receive this input either prior to, or subsequent to, the beginning of CDP window 420 at step 402 of the timing diagram of FIG. 4.

At step 306, one or more of the systems described herein may convert the changed blocks to a changed-block volume that is paired with the replication target volume. For example, conversion module 108 may, as part of computing device 202 in FIG. 2, convert changed blocks 254 to changed-block volume 270 that is paired with replication target volume 260.

As used herein, the phrase "paired with" generally refers to two separate volumes that are specifically linked together as a pair, by hardware, software, configuration, and/or metadata. In some examples, two separate volumes, such as replication target volume 260 and changed-block volume 270, may together provide a source, or basis, for the launching of a virtual machine, such as a virtual machine 504 discussed further below in connection with FIG. 5. In further examples, pairing one volume, such as changed-block volume 270, to another volume, such as replication target volume 260, may thereby supplement the data recoverable from replication target volume 260. In other words, pairing changed-block volume 270 to replication target volume 260 may thereby increase the granularity of recoverable data from a lower level of granularity (e.g., one snapshot per day) to a higher level of granularity, such as continuous data protection. Moreover, in some examples, pairing two separate volumes may further include attaching one volume, such as replication target volume 260, to the other volume, such as changed-block volume 270. The two separate volumes may be attached through hardware, software, and/or a metadata configuration.

Conversion module 108 may convert the changed blocks to changed-block volume 270 in a variety of ways. In general, conversion module 108 may populate a volume with data based on changed blocks 254. For example, conversion module 108 may generate a file system structure within changed-block volume 270. Additionally, conversion module 108 may populate the file system structure with data based on changed blocks 254. In some examples, conversion module 108 may mark, or specify, which blocks have changed over CDP window 420. In further examples, conversion module 108 may further specify the contents of the changed blocks, thereby enabling recovery of the contents of the changed blocks.

In some examples, conversion module 108 may convert the changed blocks to changed-block volume 270 in response to another event or trigger. In one example, conversion module 108 may convert the changed blocks to changed-block volume 270 in response to reception module 106 receiving the request to recover data in the replication target volume. In the example of FIG. 4, conversion module 108 may convert the changed blocks to changed-block volume 270 in response to reception module 106 receiving the request to recover data at step 406, as discussed further above. In alternative examples, conversion module 108 may convert the changed blocks to changed-block volume 270 according to a predefined schedule, and/or in response to another event, rather than in response to the performance of step 304.

In general, conversion module 108 may convert each of the changed blocks that have changed between the start of CDP window 420 at step 402 of the timing diagram of FIG. 4, and a time specified as the recovery time for recovering replicated source volume 250, as discussed further above. In other words, the time specified as the recovery time refers to the time to which the protected volume will be restored, from along a spectrum of time over which the protected volume changed. In some examples, the time specified as the recovery time for recovering replicated source volume 250 may be the same time as requesting the recovery of data at step 406. Moreover, in some examples, conversion module 108 may default to using, or specifying, the time of requesting the recovery of data at step 406 as the endpoint for the set of changed blocks to be converted to changed-block volume 270, in the absence of other input specifying an alternative endpoint.

Furthermore, in some examples, conversion module 108 may additionally generate metadata for the changed-block volume that specifies details about the changed blocks. Conversion module 108 may generate the metadata as part of the performance of step 306. In these examples, conversion module 108 may generate metadata that specifies an identity, a listing, a location, an address, and/or an offset of the changed blocks stored within changed-block volume 270.

At step 308, one or more of the systems described herein may launch a virtual machine from the replication target volume and the paired changed-block volume. For example, launching module 110 may, as part of computing device 202 in FIG. 2, launch virtual machine 504 (see FIG. 5) from replication target volume 260 and changed-block volume 270. As used herein, the phrase "launching" a virtual machine from a volume generally refers to executing the virtual machine in a manner such that the virtual machine references the volume, or a local copy of the volume, as a storage (e.g., a primary storage) containing data that corresponds to the virtual machine. Similarly, the phrase "launching" a virtual machine from two different volumes, such as replication target volume 260 and changed-block volume 270, generally refers to launching the virtual machine in a configuration such that the virtual machine dynamically, and intelligently, refers to data (or a copy of the data) on either replication target volume 260 and/or changed-block volume 270, in accordance with the redirection feature of step 312, as discussed further below in connection with FIG. 5.

Launching module 110 may launch the virtual machine in a variety of ways. In general, launching module may launch the virtual machine in response to reception module 106 receiving the request to recover data at step 304, as discussed further above. In general, system 100 and/or system 200 may perform step 306 and/or step 308 in response to reception module 106 receiving the request to recover data at step 304. In general, launching module 110 may launch the virtual machine such that the virtual machine is configured to access data on replication target volume 260 and/or changed-block volume 270. For example, replication target volume 260 and/or changed-block volume 270 may provide the file system of the primary volume on which the virtual machine relies to execute. In the example of FIG. 4, launching module 110 may launch the virtual machine at step 408 of the timing diagram shown in that figure.

At step 310, one or more of the systems described herein may determine that an intercepted read request is directed to a changed block stored within the changed-block volume. For example, determination module 112 may, as part of computing device 202 in FIG. 2, determine that an intercepted read request, such as an intercepted request 512 shown in FIG. 5, is directed to a changed block stored within changed-block volume 270. In the example of FIG. 5, request 512 may have been issued by a user 508, a corresponding user account, and/or an external program or process.

Determination module 112 may determine that the intercepted read request is directed to the changed block stored within the changed-block volume in a variety of ways. In general, determination module 112 may check whether changed-block volume 270 contains the data that is referenced by request 512 and/or that is requested by request 512.

Furthermore, determination module 112 may identify two separate sets of data. The first set of data may correspond to data that was stored and/or changed prior to the beginning of the continuous-data-protection window of time. In the example of FIG. 4, determination module 112 may identify a set of data that reflects the state of the protected volume prior to the start of CDP window 420 at step 402. Additionally, determination module 112 may identify a second set of data that reflects the state of the protected volume after the start of CDP window 420 until the point in time for the recovery of data specified in the request received at step 406. The second set of data may reflect any changes to the protected volume that occurred between the start of CDP window 420 at step 402 and the point in time specified for recovering the protected volume, as discussed above. In the illustrative example of FIG. 4, the second set of data may reflect the change to the block of data that occurred at step 404. Moreover, in the example of FIG. 4, determination module 112 may determine that the intercepted read request is directed to data stored within changed-block volume 270 in response to reception module 106 receiving the intercepted read request at step 410, as further discussed above.

At step 310, determination module 112 may select whether the data referenced by the intercepted read request refers to data within the first set of data or the second set of data, as further discussed above. In other words, determination module 112 may select whether the data referenced by the intercepted read request refers to data stored prior to the beginning of CDP window 420 or, instead, whether the data referenced by the intercepted read request refers to data that changed after the beginning of CDP window 420 at step 402 of the timing diagram shown in FIG. 4. More specifically, determination module 112 may determine that the data referenced by the intercepted read request refers to data within the second set of data that changed after the start of CDP window 420 at step 402, in accordance with step 310, as discussed above.

FIG. 5 shows an example workflow that further illustrates the performance of steps 310 and 312 of method 300. As further shown in this figure, virtual machine 504, which has been launched by launching module 110, may execute within a hypervisor 502. Moreover, as further shown in this figure, virtual machine 504 may further include both determination module 112 and redirection module 114. Determination module 112 may receive, or reference, the intercepted read request, which may correspond to request 512. In response, determination module 112 may, at step 510, determine whether the intercepted read request is directed to data stored within changed-block volume 270. Determination module 112 may make a determination of "yes" or "no" at step 510, and determination module 112 may forward this decision to redirection module 114, as further shown in FIG. 5.

At step 312, one or more of the systems described herein may redirect the intercepted read request from the replication target volume to the changed-block volume to fulfill the intercepted read request. For example, redirection module 114 may, as part of computing device 202 in FIG. 2, redirect intercepted read request 512 from replication target volume 260 to changed-block volume 270 to fulfill intercepted read request 512.

As used herein, the phrase "redirect" generally refers to altering, or deviating, a direction of the intercepted read request such that the read request is delivered to an alternative destination rather than another destination to which the read request was originally directed. In general, redirection module 114 may perform the redirection of the intercepted read request by revising, or replacing, a destination address that the intercepted read request references. Specifically, redirection module 114 may redirect the intercepted read request by revising, or replacing, a destination address that targets replication target volume 260 with an alternative destination address that targets changed-block volume 270. Similarly, redirection module 114 may redirect the intercepted read request by revising, or adjusting, an offset of the data targeted by the intercepted read request to an offset of corresponding (e.g., changed) data within a corresponding volume such as changed-block volume 270 (e.g., revising based on a difference between an offset of the targeted data within replication target volume 260 and an offset of the targeted data within changed-block volume 270).

Redirection module 114 may redirect the intercepted read request in a variety of ways. In general, redirection module 114 may redirect the intercepted read request by revising, or altering, a target storage address referenced by the intercepted read request, as further discussed above. For example, redirection module 114 may redirect the intercepted read request by reconfiguring the intercepted read request to refer to the changed block stored within changed-block volume 270 rather than referring to the same block, prior to the change, stored within replication target volume 260.

In some examples, redirection module 114 may include, or correspond to, a kernel-level module. As used herein, the term a "kernel-level module" generally refers to a software module, or other module, that executes at the level of a kernel of an operating system or as part of the kernel of the operating system. In the example of FIG. 5, redirection module 114 may execute as part of a kernel of computing device 202. Furthermore, in some examples, hypervisor 502 may execute as part of the same kernel of computing device 202 and, in other examples, hypervisor 502 may execute outside of the same kernel of computing device 202. Additionally, in some examples, redirection module 114 may optionally execute outside of hypervisor 502. In fact, in further examples, redirection module 114 (and/or determination module 112) may have no access to, or visibility into, hypervisor 502.

In the case that redirection module 114 further includes a kernel-level module, the kernel-level module may optionally be configured to intercept each read request at the virtual machine that issues over a period of time. In other words, the kernel-level module may intercept each, and every, read request over a period of time (e.g., an arbitrary period of time) to thereby ensure that all of the intercepted read requests are appropriately redirected in accordance with step 312, as discussed further below. Furthermore, the kernel-level module, and redirection module 114 more generally, may perform the redirecting of the intercepted read request from the replication target volume to the changed-block volume at least in part by referencing metadata for the changed-block volume that conversion module 108 generated as part of the performance of step 306, as discussed further above.

In some examples, request 512 is independent of, and issued subsequent to, request 256 that is discussed above in connection with FIG. 2. In other examples, request 512 may be included within request 256.

In response to determination module 112 making the determination at step 510 of FIG. 5, redirection module 114 may receive, or reference, the determination made at step 510 to redirect request 512 to changed-block volume 270. Redirection module 114 may perform the redirection feature of step 312 in response to determination module 112 determining, at step 310 and step 510, that the intercepted read request is directed to data stored within changed-block volume 270. In contrast, if determination module 112 determines, at step 510, that the intercepted read request is not directed to data stored within changed-block volume 270 (i.e., if determination module 112 makes a determination corresponding to the "no" path of the workflow diagram shown in FIG. 5), then redirection module 114 may simply, and optionally, forward the intercepted read request to replication target volume 260 without performing any redirection, or alteration, of the intercepted read request.

Moreover, in the example of FIG. 5, replication target volume 260 and changed-block volume 270 may be stored within a storage 506, which may correspond to an internal or external memory, such as memory 140, of computing device 202. Furthermore, in this example, replication target volume 260 within storage 506 may correspond to a copy of replication target volume 260 that was previously stored within server 206, and which was downloaded from server 206 in order to satisfy the request received at step 304 to recover data (in accordance with the performance of steps 308-312 of method 300).

In some examples, replication target volume 260 is stored in a third-party cloud storage service. As used herein, the term "third-party cloud storage service" generally refers to a cloud storage service that is independent of a client or customer that is generating, altering, and/or replicating data, as well as independent of a corporate storage service that replicates the data, and dynamically redirects one or more intercepted read requests in accordance with step 314, using the third-party cloud storage service as a proxy or an intermediary that provides generic cloud storage services.

Furthermore, in these examples, the kernel-level module, and redirection module 114 more generally, may be cloud storage service agnostic. As used herein, the phrase "cloud storage service agnostic" generally refers to redirection module 114 performing, and functioning, substantially the same regardless of which cloud storage service is used (e.g., AMAZON S3, MICROSOFT AZURE, and/or GOOGLE CLOUD STORAGE).

Returning to FIG. 4, after the performance of redirecting the intercepted read request at step 312, and at corresponding step 412 of the timing diagram of FIG. 4, CDP window 420 may end or finish at step 414. In response, one or more of modules 102 may optionally synchronize replication target volume 260 with changed-block volume 270. For example, conversion module 108 may optionally synchronize replication target volume 260 with changed-block volume 270, at step 416 of the timing diagram of FIG. 4, such that the replication target volume accurately reflects the changed blocks. In other words, conversion module 108 may synchronize replication target volume 260 with changed-block volume 270 upon expiration of, or in response to, expiration of the continuous-data-protection window of time at step 412 of the timing diagram of FIG. 4.

The above discussion provides a general overview of the performance of method 300 as shown in FIG. 3. Additionally, the following discussion provides a detailed overview of concrete embodiments of the disclosed systems and methods.

Recovering from any point in time, in accordance with continuous data protection, has high storage costs. In part to address these concerns, the disclosed systems and methods may minimize storage requirements and/or provide an instant recovery to a virtual machine at any point in time in accordance with continuous data protection. The disclosed systems and methods may work with either block storage or object storage. Moreover, the disclosed systems and methods may operate without any need for, or access to, a hypervisor, as discussed above in connection with FIG. 5. Furthermore, the disclosed systems and methods may be cloud storage service or vendor agnostic.

The disclosed systems and methods may operate optionally in accordance with a number of steps. First, the disclosed systems and methods may maintain a list of changed blocks in update sets. These update sets may correspond to changed blocks 254 discussed above in connection with FIG. 2. Second, the disclosed systems and methods may accumulate the update sets over a period of time, which may be specified by a user. For example, the update sets may be collected for at least seven days, and the period of seven days may correspond to a continuous data protection window, such as CDP window 420 of FIG. 4.

Third, once CDP window 420 is crossed or expired, the update sets may be written to a final destination disk. Fourth, the user can choose to recover data from any point in time in the last seven days, or otherwise occurring within CDP window 420. Fifth, the disclosed systems and methods may convert the update sets (which may optionally include all of the update sets prior to the time of the conversion) into a volume. The disclosed systems and methods may also generate metadata on the volume, and the metadata may signify the volume details and the update set details. Six, the newly generated volume may be attached to an instance of the virtual machine corresponding to the protected volume. Moreover, the instance of the virtual machine may be launched, as discussed above in connection with step 308 of method 300.

Seventh, the disclosed systems and methods may include a block kernel-module, such as IOTAP, within the application virtual machine. The block kernel-module may understand the update set volume and the generated metadata. Eighth, the disclosed systems and methods may perform read request redirection when the application virtual machine is executing, because the latest write operations, or the latest specified point in time of this application virtual machine, may be stored on the newly generated volume.

Ninth, any read request which is requested by an application executing on the virtual machine, or by the virtual machine itself, may be captured by the block kernel-module, such as IOTAP. The disclosed systems and methods may check whether the data requested by the intercepted read request is present on the newly generated volume (e.g., the changed-block volume corresponding to changed-block volume 270 discussed above in connection with FIG. 2). If, in response to that checking, the disclosed systems and methods determine that the requested data is located on the newly generated volume, then data for the intercepted read request will be fulfilled from the newly generated volume rather than from the replication target volume. Otherwise, the data for the intercepted read request will be fulfilled from the replication target volume. Eleventh, in the meanwhile, the update set disk (e.g., changed-block volume 270) may be synchronized with the replication target volume. The synchronization may be performed by the block kernel-module, such as IOTAP. In this manner, the disclosed systems and methods may provide an instant point in time to recover to any virtual machine that is stored in a cloud storage service. The disclosed systems and methods may not need, or require, any specific storage server, and instead the disclosed systems and methods may work with an existing replication solution, such as a replication solution that periodically stores a snapshot corresponding to replication target volume 260, as discussed above in connection with FIG. 2.

Furthermore, the disclosed systems and methods may provide, or enable, "instant" continuous data protection. The continuous data protection may be "instant" in the sense that it provides recovery of data while temporarily avoiding a cumbersome, or slow, process of synchronizing a previously stored snapshot with intermediary changed blocks, such as changed blocks stored within changed-block volume 270. Instead of immediately, or directly, performing the synchronization process, the disclosed systems and methods may immediately launch a virtual machine, as discussed above in connection with step 308 of method 300, and a redirection module, such as redirection module 114, may dynamically, or intelligently, redirect intercepted read requests to appropriately accomplish continuous data protection (e.g., in accordance with the discussion of FIG. 5 above), thereby performing a kind of synchronization "on the fly" rather than performing total synchronization prior to launching of the virtual machine. Additionally, the disclosed systems and methods may avoid, and may not require, any access to, or visibility into, a hypervisor, as outlined above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for recovering data, at least a portion of the method being performed by a computing device comprising at least one processor, the method comprising:
    accumulating a list of changed blocks that have changed in a replicated source volume over a continuous-data-protection window of time;
    receiving a request to recover data in a replication target volume of the replicated source volume;
    converting the changed blocks to a changed-block volume that is paired with the replication target volume;
    launching a virtual machine from the replication target volume and the paired changed-block volume;
    determining that an intercepted read request is directed to a changed block stored within the changed-block volume; and
    redirecting the intercepted read request from the replication target volume to the changed-block volume to fulfill the intercepted read request.

2. The computer-implemented method of claim 1, wherein redirecting the intercepted read request from the replication target volume to the changed-block volume is performed by a kernel-level module.

3. The computer-implemented method of claim 2, wherein the kernel-level module is configured to intercept each read request at the virtual machine that issues over a period of time.

4. The computer-implemented method of claim 2, wherein:
    the method further comprises generating metadata for the changed-block volume that specifies details about the changed blocks; and
    the kernel-level module performs the redirecting the intercepted read request from the replication target volume to the changed-block volume at least in part by referencing the generated metadata for the changed-block volume.

5. The computer-implemented method of claim 2, wherein the kernel-level module performs the redirecting the intercepted read request inside of the virtual machine without accessing a hypervisor that executes the virtual machine.

6. The computer-implemented method of claim 2, wherein:
    the replication target volume is stored in a third-party cloud storage service; and
    the kernel-level module is cloud storage service agnostic.

7. The computer-implemented method of claim 1, further comprising synchronizing the replication target volume with the changed-block volume such that the replication target volume accurately reflects the changed blocks.

8. The computer-implemented method of claim 7, wherein synchronizing the replication target volume with the changed-block volume is performed upon expiration of the continuous-data-protection window of time.

9. The computer-implemented method of claim 1, further comprising receiving user input that specifies a length of the continuous-data-protection window of time.

10. The computer-implemented method of claim 1, wherein receiving the request to recover data in the replication target volume of the replicated source volume comprises receiving a request to recover the replicated source volume to a specified point of time within the continuous-data-protection window of time.

11. A system for recovering data, the system comprising:
    an accumulation module, stored in memory, that accumulates a list of changed blocks that have changed in a replicated source volume over a continuous-data-protection window of time;
    a reception module, stored in memory, that receives a request to recover data in a replication target volume of the replicated source volume;
    a conversion module, stored in memory, that converts the changed blocks to a changed-block volume that is paired with the replication target volume;
    a launching module, stored in memory, that launches a virtual machine from the replication target volume and the paired changed-block volume;
    a determination module, stored in memory, that determines that an intercepted read request is directed to a changed block stored within the changed-block volume;
    a redirection module, stored in memory, that redirects the intercepted read request from the replication target volume to the changed-block volume to fulfill the intercepted read request; and at least one physical processor configured to execute the accumulation module, the reception module, the conversion module, the launching module, the determination module, and the redirection module.

12. The system of claim 11, wherein the redirection module comprises a kernel-level module.

13. The system of claim 12, wherein the kernel-level module is configured to intercept each read request at the virtual machine that issues over a period of time.

14. The system of claim 12, wherein:
the conversion module further generates metadata for the changed-block volume that specifies details about the changed blocks; and
the kernel-level module performs the redirecting the intercepted read request from the replication target volume to the changed-block volume at least in part by referencing the generated metadata for the changed-block volume.

15. The system of claim 12, wherein the kernel-level module performs the redirecting the intercepted read request inside of the virtual machine without accessing a hypervisor that executes the virtual machine.

16. The system of claim 12, wherein:
the replication target volume is stored in a third-party cloud storage service; and
the kernel-level module is cloud storage service agnostic.

17. The system of claim 11, wherein the conversion module synchronizes the replication target volume with the changed-block volume such that the replication target volume accurately reflects the changed blocks.

18. The system of claim 17, wherein the conversion module synchronizes the replication target volume with the changed-block volume upon expiration of the continuous-data-protection window of time.

19. The system of claim 11, wherein the reception module is configured to receive user input that specifies a length of the continuous-data-protection window of time.

20. A non-transitory computer-readable medium comprising one or more computer-readable instructions that, when executed by at least one processor of a computing device, cause the computing device to:
accumulate a list of changed blocks that have changed in a replicated source volume over a continuous-data-protection window of time;
receive a request to recover data in a replication target volume of the replicated source volume;
convert the changed blocks to a changed-block volume that is paired with the replication target volume;
launch a virtual machine from the replication target volume and the paired changed-block volume;
determine that an intercepted read request is directed to a changed block stored within the changed-block volume; and
redirect the intercepted read request from the replication target volume to the changed-block volume to fulfill the intercepted read request.

* * * * *